United States Patent [19]

King

[11] Patent Number: 4,899,422
[45] Date of Patent: Feb. 13, 1990

[54] FISH PROCESSING MACHINE WITH AUTOMATIC LENGTH RESPONSIVE CUTTING CONTROL MECHANISM

[76] Inventor: James J. King, 33 Hazelhurst Street, Darthmouth, Nova Scotia B2Y 3N1, Canada

[21] Appl. No.: 263,860

[22] Filed: Oct. 28, 1988

[51] Int. Cl.⁴ ............................................. A22C 25/06
[52] U.S. Cl. .................................... 17/54; 17/52; 17/63
[58] Field of Search .................. 17/54, 53, 61, 63, 52

[56] References Cited

U.S. PATENT DOCUMENTS

| | | | |
|---|---|---|---|
| 3,380,114 | 4/1968 | Hartl et al. | 17/45 |
| 3,461,485 | 8/1969 | Crepeau | 17/63 |
| 3,488,799 | 1/1970 | Danielsson | 17/60 |
| 3,596,308 | 8/1971 | Kenny et al. | 17/56 |
| 3,670,363 | 6/1972 | Hogan et al. | 17/55 |
| 3,919,741 | 11/1975 | Backhaus et al. | 17/63 |
| 3,925,847 | 12/1975 | Leander et al. | 17/63 |
| 4,025,988 | 5/1977 | Hartmann et al. | 17/54 |
| 4,084,294 | 4/1978 | Dohrendorf | 17/57 |
| 4,215,452 | 8/1980 | Nagrotzki | 17/60 |
| 4,551,885 | 11/1985 | Molnar | 17/59 |
| 4,563,793 | 1/1986 | Ryan | 17/58 |
| 4,726,094 | 2/1988 | Braeger | 17/54 |

FOREIGN PATENT DOCUMENTS

| | | |
|---|---|---|
| 672525 | 10/1963 | Canada . |
| 780591 | 3/1968 | Canada . |
| 1050627 | 3/1979 | Canada . |
| 1091405 | 12/1980 | Canada . |
| 1094763 | 2/1981 | Canada . |
| 1111213 | 10/1981 | Canada . |
| 1128719 | 8/1982 | Canada . |
| 1180519 | 1/1985 | Canada . |
| 1184714 | 4/1985 | Canada . |
| 1199760 | 1/1986 | Canada . |
| 1208403 | 7/1986 | Canada . |
| 1211070 | 9/1986 | Canada . |
| 2927583 | 4/1980 | Fed. Rep. of Germany .......... 17/54 |
| 512751 | 5/1976 | U.S.S.R. ................... 17/54 |
| 759843 | 8/1980 | U.S.S.R. ................... 17/54 |
| 1497512 | 1/1978 | United Kingdom . |

OTHER PUBLICATIONS

Baader 440 Service Manual (Mar. 1980).

*Primary Examiner*—Willis Little
*Attorney, Agent, or Firm*—Banner, Birch, McKie and Beckett

[57] ABSTRACT

A fish processing device with an automatic length responsive cutting control mechanism which controls fish processing operations in response to fish length according to fish specie input. Fish length is determined and geometrically compared to proportionality values, selected according to fish specie, through similar triangle associations to control processing mechanisms, e.g., to engage or disengage cutting devices along the fish processing path.

19 Claims, 15 Drawing Sheets

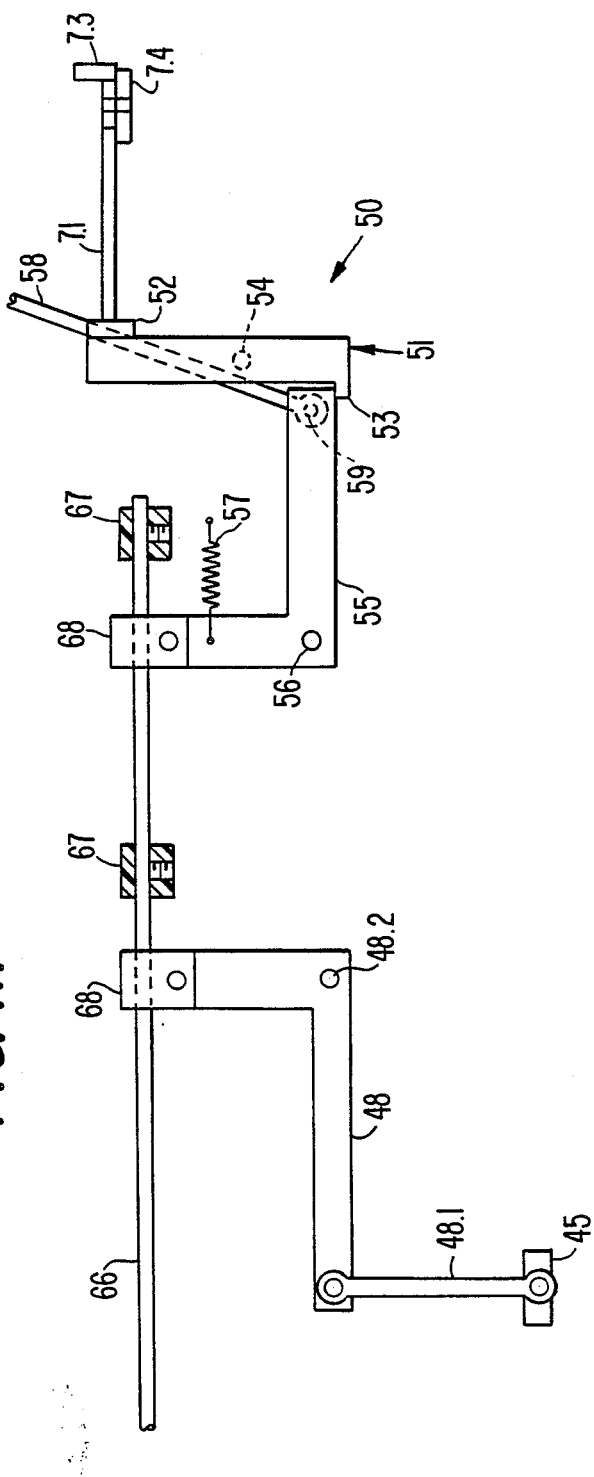
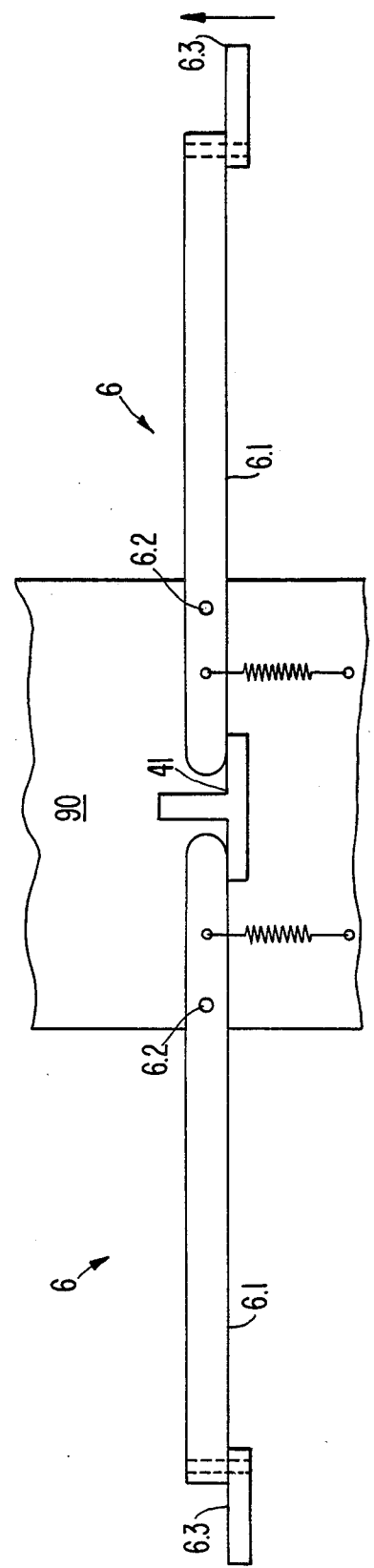
FIG. 17.
FIG. 16.

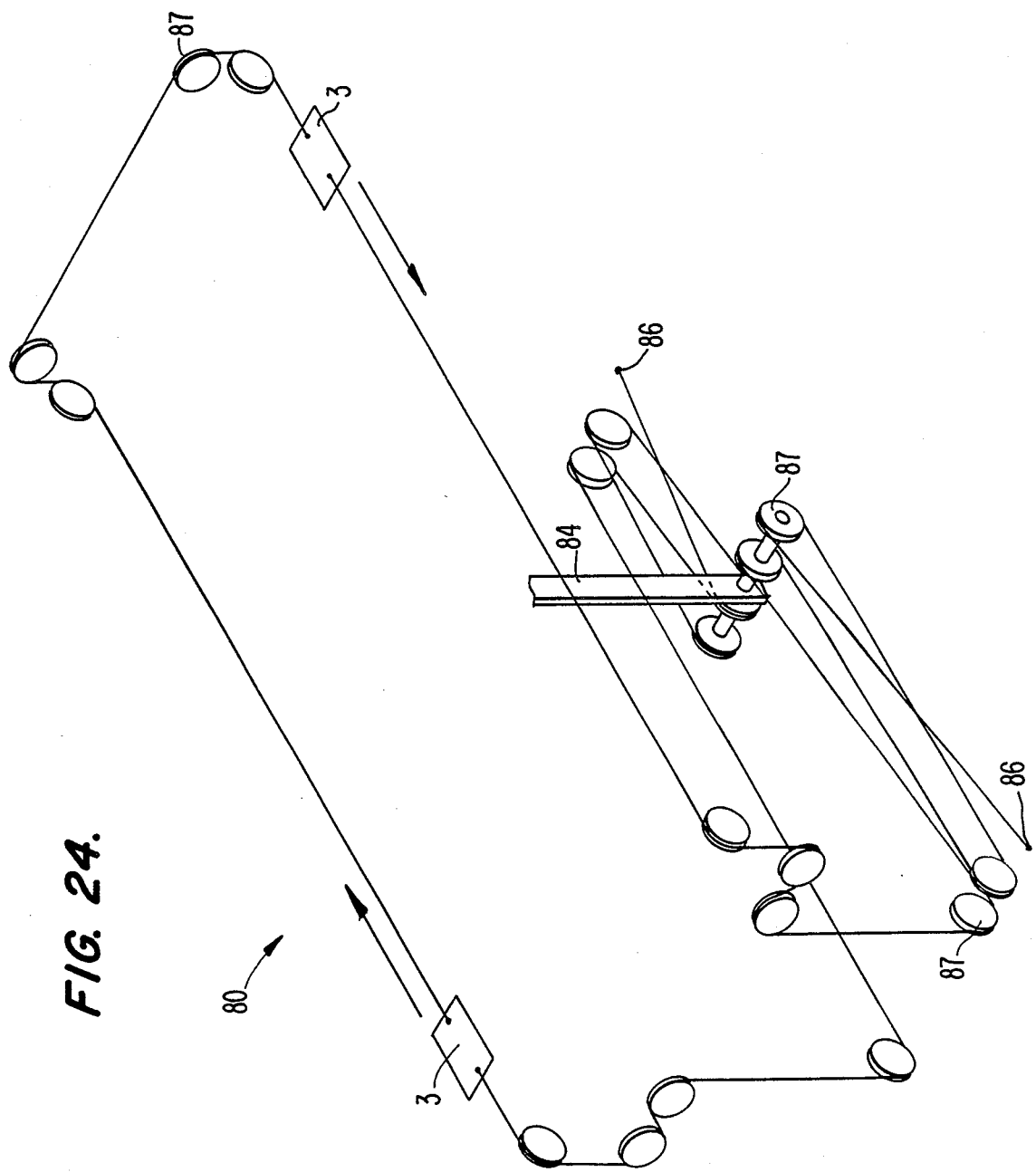

FISH PROCESSING MACHINE WITH AUTOMATIC LENGTH RESPONSIVE CUTTING CONTROL MECHANISM

BACKGROUND OF THE INVENTION

The invention relates to the fish processing art and more particularly to fish processing apparatus which automatically control fish processing operations (e.g., beheading, gutting, splitting, filleting and bone removing operations) in response to measured fish length and fish specie input.

Economical fish processing requires cutting fish at appropriate anatomical locations to minimize waste and avoid subsequent separating operations of unwanted fish parts. Manual fish splitting by skilled artisans is labor intensive and thus not cost effective. Furthermore, as more of the older generation who have the skill for splitting fish retire, fewer fishermen are available who have the skill or willingness to split fish.

As a result, methods for automatically cutting fish were developed. However, automatically controlled fish cutting apparatus must account for various fish sizes within a given specie to enable appropriate processing such as providing for appropriately located cuts.

Methods for automatically controlling cutting tools during fish splitting, gutting and beheading operations according to fish length have incorporated the proportionality principle disclosed in Canadian Fisheries and Aquatic Sciences Report #1457, by J. M. McGlade and E. G. Boulding, "The Truss: A Geometric and Statistical Approach to the Analysis of Form in Fishes" (1986). According to the report, fish of one specie are proportionally identical regardless of length. However, such proportions change among species. For instance, a cod fish might have its anus at a distance from one end of the fish corresponding to 50% of its overall length. On the other hand, a haddock might have similar anatomy at a distance from a similar end corresponding to 45% of its overall length.

Canadian Patent No. 1,050,627 discloses an automatic fish processing apparatus incorporating the above principal in a complex mechanical linkage mechanism which provides proportional control to the cutting tools.

Canadian Patent No. 1,111,313 (Hartman) also incorporates the proportionality principle to control the timing and displacement of the cutting tools. Hartman first determines fish length by counting electrical pulses while the fish is conveyed past a pulse receiver. These pulses are processed by a computer to determine fish length. This value is compared with pre-programmed fish proportionality data to control the cutting tools.

SUMMARY OF THE INVENTION

The present invention incorporates principles of fish proportionality and similar triangles to control cutting mechanisms during processing. Fish length is determined and geometrically compared to preselected proportionality values through similar triangle associations to control processing mechanisms, e.g., to engage or disengage cutting devices along the fish processing path.

An apparatus for automatically controlling engagement of processing mechanisms, e.g., cutting tools, according to the present invention includes a substantially straight linear guide structure forming a processing path; a first transport carriage mechanism for conveying items, e.g., fish, along the processing path comprising a first transport carriage; a substantially straight bar having first and second ends, the first end being pivotally associated with the first transport carriage; a locking device for enabling angular and linear displacement of the second end of the bar when the first end of said bar is aligned with a first measuring portion of said processing path and restraining such angular and linear displacement when the first end of the bar is aligned with a second portion of the processing path downstream from the first measuring portion; a control mechanism for controlling cutting tool engagement of at least one of the processing mechanisms; and a sensor for sensing when a portion of the bar is disposed vertically beneath the second path portion and generating a signal denoting such a condition to the at least one control mechanism.

According to the invention, a method for processing fish includes the steps of providing a preselected proportionality value, mechanically setting a representation of a dimension of a fish comprising the step of locking a measuring bar in a particular orientation indicative of the length of the fish, conveying the fish to at least one processing device for processing the fish and controlling the processing device in accordance with the representation of fish length and preselected proportionality value.

Therefore, it is an object of the invention to provide a fish processing device having an automatic length responsive processing control mechanism which, for example, consistently and accurately controls the cutting of fish at preselected anatomical locations without interfering with adjacent anatomy when confronted with processing fish of various sizes.

It is another object of the invention to provide an economically feasible fish processing device having an automatic cutting control mechanism which would be portable and of simple construction so that the device could be used to process fish at sea as well as on land, and easily repaired in seaport communities.

It is yet another object of the invention to provide a fish processing device having an automatic cutting control mechanism wherein a simple adjustment changes the proportionality value input, thereby affording quick set-up time when such changes are necessary due to changes in fish specie.

It is a further object of the invention to provide a fish processing device having an automatic cutting control mechanism substantially made up of mechanical components, thereby minimizing the need for electrical components such as contacts which may more readily malfunction at sea or at port sites due to the salt atmosphere so that downtime, and repair or maintenance costs are minimized.

Other important features and advantages of the invention will be apparent from the following description and the accompanying drawings, wherein, for purposes of illustration only, a specific form of the invention is set forth in detail.

BRIEF DESCRIPTION OF THE DRAWINGS

FIGS. 4 and 5 sequentially show fish length measuring and determination stages with the development of the proportional triangles in response to measured fish length. FIG. 6 shows a first sensor sensing the position of the measuring bar at a first processing station, while FIG. 7 shows a second sensor sensing the position of the measuring bar at a second processing station. FIG. 8 shows the processed fish being discharged.

FIG. 16 is a bottom plan view of a preferred embodiment of the first sensor mechanism.

FIG. 17 is a side view of a preferred embodiment of the second sensor mechanism showing its relationship to the first and second control mechanisms.

FIG. 24 is a perspective schematic view of the fish transport carriage reciprocating drive mechanism.

DETAILED DESCRIPTION OF THE PREFERRED EMBODIMENTS

Figure 1:
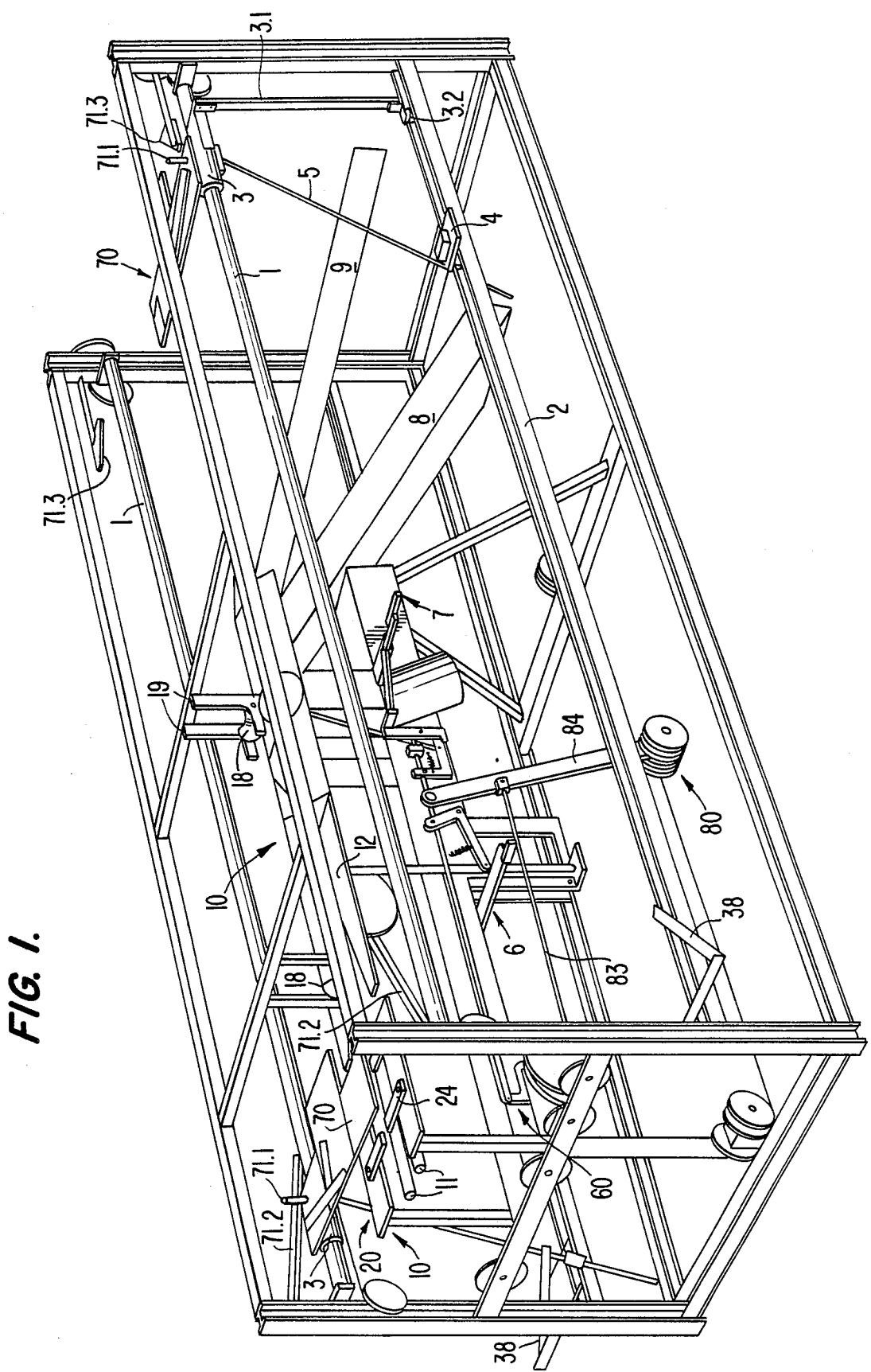
FIG. 1 is a perspective view of the fish processing machine with automatic length responsive cutting control mechanisms in accordance with the invention.
Figure 2:
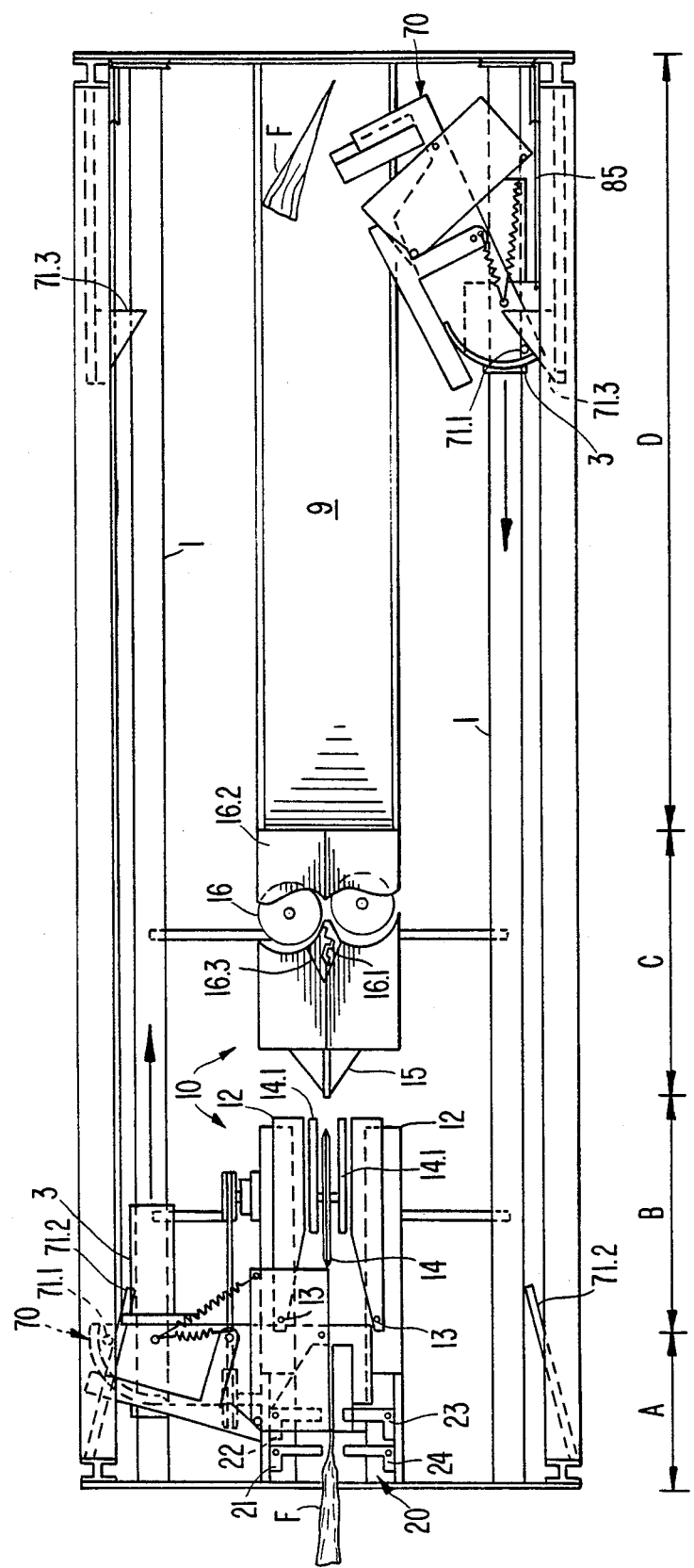
FIG. 2 is a top plan view of the fish processing machine depicted in FIG. 1.

Referring to FIGS. 1 and 2, two fish transport assemblies are shown on opposite sides of fish guide structure 10 which forms the fish processing path. The dual transport system increases processing efficiency over a single fish transport assembly design. However, it should be understood that a single transport assembly could be used without detracting from the length responsive processing control features of the invention. Furthermore, for purposes of simplification, only one fish transport assembly will be described in detail as the other is substantially a mirror image of the first on the opposite side of fish guide structure 10.

Each fish transport assembly includes upper transport rail 1 with transport carriage 3 slidably mounted thereon, lower rail or beam 2 with lower follower carriage 4 slidably mounted thereon, and measuring bar 5 having a first end pivotally associated with transport carriage 3 and a second end pivotally and slidably associated with follower carriage 4. Measuring bar 5 sequentially contacts sensors 6 and 7 as transport carriage 3 pulls it along a plane generally parallel to a plane defined by rails 1 and 2 to actuate control mechanisms for controlling processing mechanisms along the fish processing path (discussed in detail below).

Each cylindrical transport carriage 3, from which fish tail grip assembly 70 extends, travels along upper transport rail 1. A brace member 3.1 is secured to each transport carriage 3. Secured to the other end of each brace member 3.1 is roller 3.2. Roller 3.2 is positioned between flanges of lower rail or beam 4 to prevent transport carriage 3 from rotating about upper rail 1 and maintain tail grip assembly horizontal, while allowing brace member 3.1 and transport carriage 3 to translate freely. Each tail grip assembly 70 includes a chassis which extends from its respective carriage to the fish processing path where the tail grip assembly grip mechanism for gripping the fish tail is positioned during a feed stroke. Referring to FIG. 2, at the end of a feed stroke, a rotation mechanism (infra) rotates the tail grip assembly from a position perpendicular to transport rail 1 (perpendicular to the path of transport carriage 3) to a position parallel to transport rail 1 (parallel to the path of transport carriage 3). Assembly 70 is rotated again at the end of a return stroke so as to extend over the fish processing path in preparation for another feed stroke (infra). The rotation prevents collisions between tail grip assemblies when one transport carriage 3 is on a feed stroke and the other transport carriage is on a return stroke. Such synchronization further enables each transport carriage to use the same processing mechanism along the fish processing path.

Referring to FIG. 1, fish guide structure 10 begins with guide rails 11 to guide and support fish F through fish length measuring mechanism 20 so that feeler bars 21, 22, 23 and 24 (see FIG. 2) contact the sides of the fish as it passes therethrough. Referring to FIG. 2, the guide structure further includes, in sequence, guides 12, splitter blade 14 with movable side guards 14.1, spreader 15, bone removal blades 16 with flap-type guards 16.1 and stationary guard 16.2. In sum, the processing path of the preferred embodiment includes fish length measuring stage A, splitting stage B, bone removal stage C and discharge D of the processed fish along discharge chute 9. Returning to FIG. 1, discharge chute 8 is shown adjacent blades 16 for receiving unwanted fish parts.

While the invention is being described with respect to fish splitting and bone removal operations, it should be understood that the machine could include beheading, gutting, splitting, filleting and bone removal operations, or any combination thereof. Furthermore, the later described control mechanisms for controlling the cutting during splitting and bone removal in response to measured fish length and fish specie input could be applied to beheading, gutting or filleting operations. Finally, the linkages and mechanisms that incorporate fish proportionality and similar triangles to control processing operations, discussed in detail below, are not limited to the processing operations described herein as they could be applied to most any operation to be made on the fish during processing.

Figure 15:
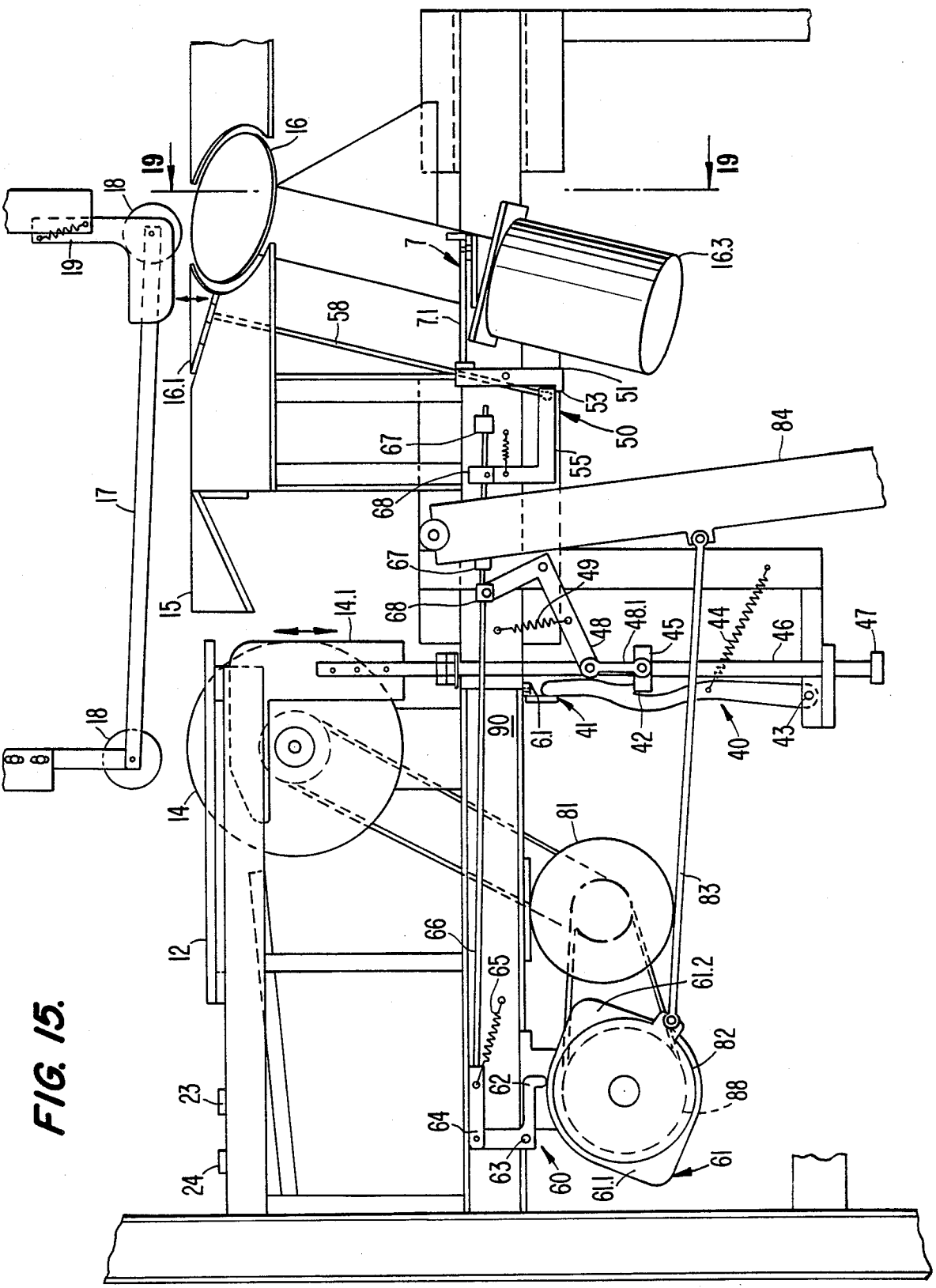
FIG. 15 is a side elevational view of a major portion of the fish processing machine showing first and second blade guard control mechanisms and sensors therefor.

Returning to guide structure 10, spring biased lateral fish guides 12 are pivotally mounted about pins 13 to support the fish during splitting. After the fish is split from tail to belly by splitter blade 14, tail grip assembly 70 continues to travel to bring the split fish to spreader 15. Spreader 15 is best illustrated in FIGS. 2 and 15. Spreader 15 includes a central rib or vertically raised portion for penetrating the split in the fish and centering the fish for further processing. The sides depending downwardly from the raised portion are contoured to spread the split fish flatter as it passes over spreader 15, i.e., the upstream V-shape of the spreader gradually opens to provide a flatter downstream portion.

Referring to FIG. 15, a dorsal guide above both processing stations is shown which includes two parallel members 17 (one member is behind the one shown) with rollers 18 connecting the ends thereof. Members 17 are pivotally secured at the roller shown to the left, while viewing FIG. 15, which is associated to the frame. The other ends of members 17 are associated with vertically slidable guide supports 19 (also shown in FIG. 1) which allow the members to pivot about the left end and which are connected to a portion of the frame by an extension spring. The dorsal guide roller above splitter blade 14 assists in aligning the fish and urging it against the splitter blade during splitting. Members 17 assist spreader 15 in spreading the fish by urging the fish against the spreader. The other dorsal guide roller above blades 16, assists in aligning the fish and urging it against the V-blade during bone removal. After bone removal, the processed fish passes over stationary blade guard 16.2 which protects the fish from the downstream side of blades 16. Finally, processed fish F is discharged along chute 9.

Figure 3:
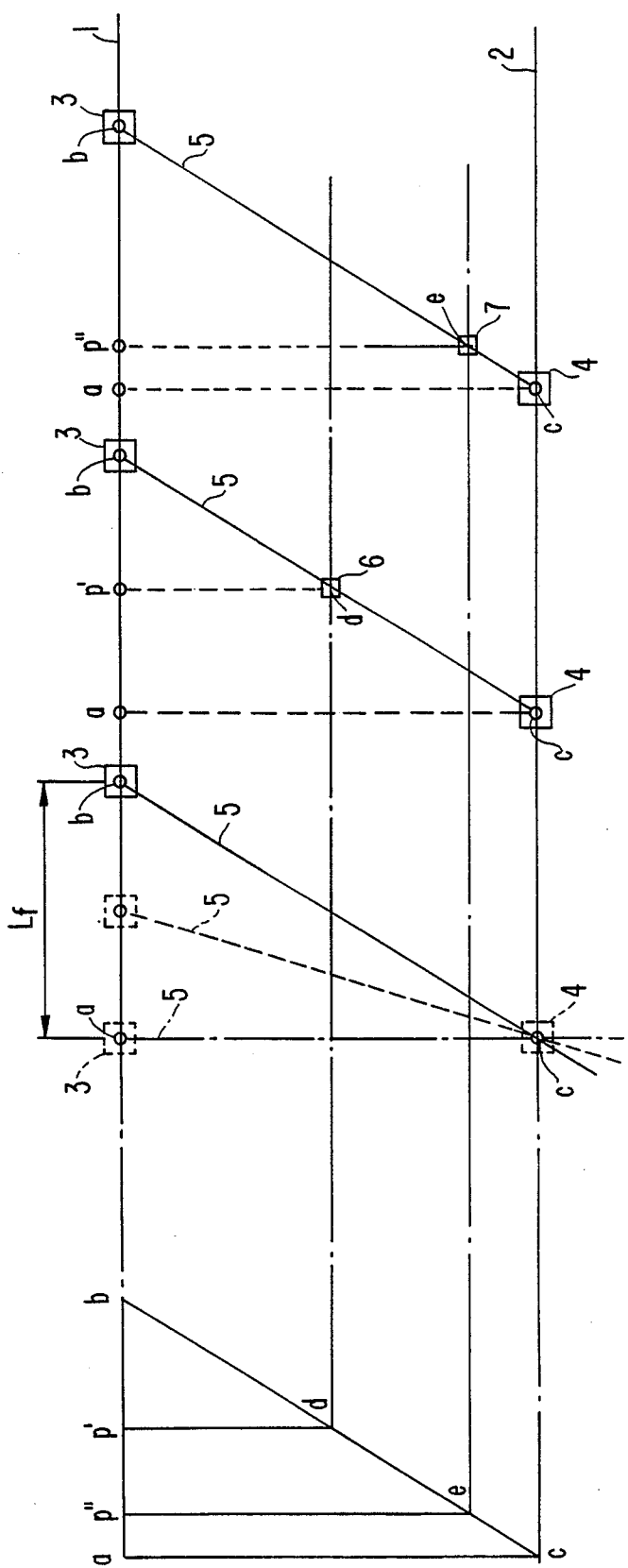
FIG. 3 diagrammatically shows the length responsive cutting control linkage and similar triangles developed thereby.

FIGS. 3–8 may be referred to as best illustrating the manner in which fish length is determined and geometrically compared to preselected proportionality values, using similar triangles, to control the operation of fish processing operations. FIG. 3 schematically shows the proportionality linkage with associated sensors which actuate the processing control mechanisms. FIGS. 4–8 represent the measuring, splitting and bone removal stages during a feed stroke of a respective carriage. Although the fish would normally have been beheaded prior to splitting and bone removal, the fish head has been included in FIGS. 4–8 for aesthetic value. Furthermore, other processing operations may be included in the machine with the inclusion of further sensors and process control mechanisms (infra), or they may be substituted for the described splitting or bone removal operations.

Referring to FIG. 3, triangle abc is formed by measured fish length ab, fixed distance ac measured between center lines of rails 1 and 2, and length bc measured along measuring bar 5 between transport carriage 3 and follower carriage 4. For illustrative purposes only, first sensor 6 has been positioned arbitrarily at a distance of 50% of bc below rail 1, i.e., P'd, while second sensor 7 has been positioned arbitrarily at a distance of 80% of bc below rail 2, i.e., P"d. It has been said that the 50% and 80% proportionality values have been arbitrarily selected for illustrative purposes only because the percentages depend on preselected values which will vary according to fish specie proportionality data and the intended anatomical location to be processed. Similar triangles, extrapolated from the relative positions of these elements, are shown to the left of FIG. 3 for clarity. These triangles diagrammatically relate measured fish length to preselected proportionality values P' and P".

Proceeding from left to right in FIG. 3, $L_f$ represents the final fish length measurement at the end of the fish length measuring stage. The fish tail begins at point a, where the first length measurement feeler bar(s) is positioned, which will be described in detail below. Then transport carriage 3 carries the tail to point b as the other end of the fish reaches point a. During the determination of fish length $L_f$, follower carriage 4 is locked in position as measuring bar 5 slides through and pivots with its connection with follower carriage 4. Once the fish length is determined, follower carriage 4 is released and is free to follow transport carriage 3 through its connection with measuring bar 5. At this moment triangle abc is fixed and is shown diagrammatically as moving to the right.

Measuring bar 5 travels to the right and contacts sensor 6 which in turn actuates the control mechanism discussed below which engages or disengages the processing operation at P', i.e., at a distance measured from the fish tail, equal to 50% of the measured fish length. Since triangles abc and P'bd are similar triangles and P'd is 50% of ac, it follows that P'b is 50% of ab. Measuring bar 5 continues to travel and contacts sensor 7. Sensor 7 then actuates the next control mechanism, discussed below, which engages or disengages the processing operation at P", i.e., at a distance measured from the fish tail, equal to 80% of the measured fish length.

In sum, by having the triangle abc move as a unit directly below the fish, any proportional point on the fish is defined by a point on measuring bar bc. This point on bc, in turn is preselected by setting a sensor at a desired proportional height of ac. In this illustration, sensors are represented at 6 and 7. Even though only two sensors are used in this example, any number of sensors can be used to control various processing actions from fish tail to fish nose. Furthermore, various types of sensors may be incorporated including electrically or optically activated sensors as well as the mechanical sensor mechanisms described in detail below.

Referring to FIGS. 4–8, a complete processing cycle will be described.

Figure 4:
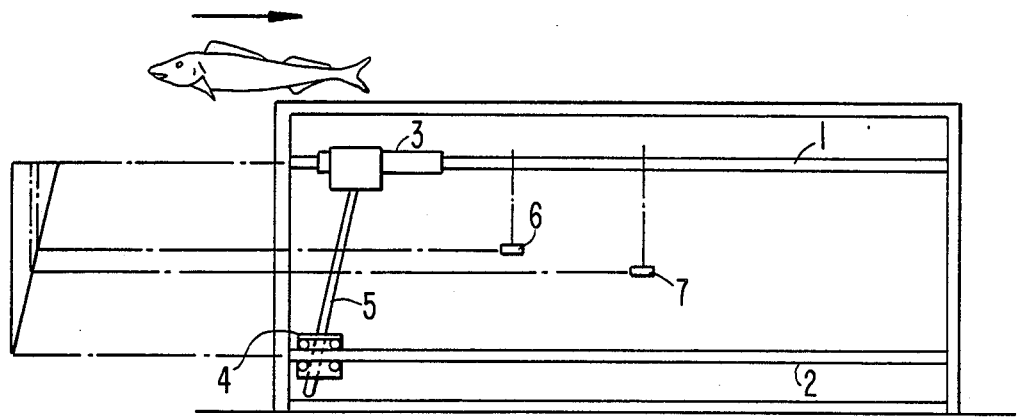
FIGS. 4–8 schematically illustrate a feed stroke of a fish processing cycle.

Step (1) A fish is placed tail first into the machine. The tail is grasped by the tail grip assembly extending from transport carriage 3 to the fish processing path. Carriage 4 is at this time stationary and measuring bar 5 is free to rotate about and slide through its attachment at carriage 4. Transport carriage 3 begins to move away from point a, expanding triangle abc as carriage 3 moves and carriage 4 remains fixed (FIG. 4).

Figure 5:
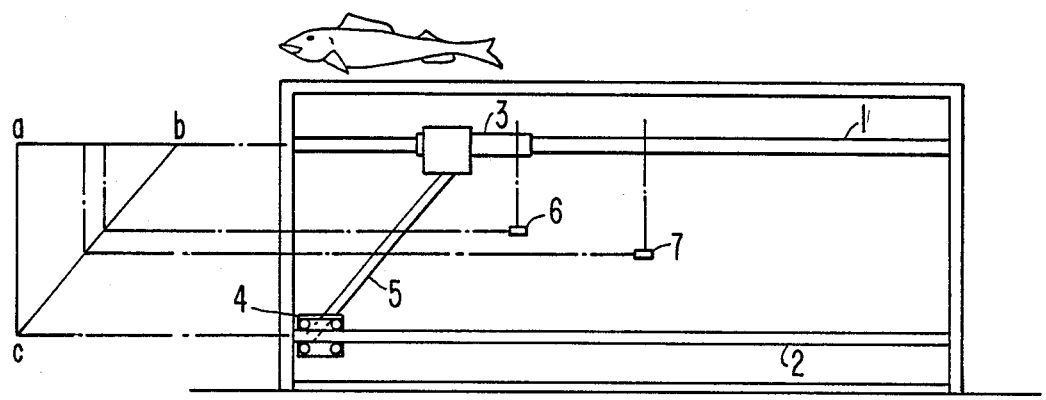
Figure 10:
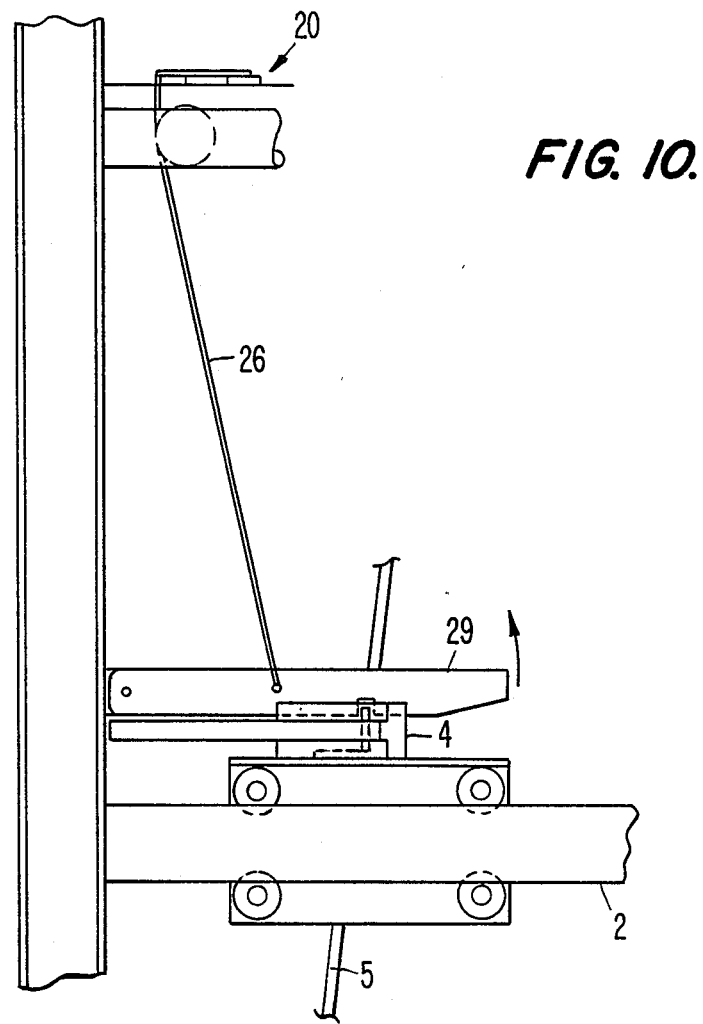
FIG. 10 is a side elevational view showing the relationship between the fish length measuring mechanism and the lower carriage latch device in a locked position.

Step (2) When the fish nose or the end of the fish opposite the fish tail passes point a, spring loaded feeler bars, previously held open by the fish, snap shut and pull a cord that unlatches carriage 4 (described below in reference to FIGS. 9–11) (FIG. 5). Carriage 4 moves forward and strikes a projection which engages a lock that prevents measuring bar 5 from extending further (described below in reference to FIGS. 12–14). Triangle abc is now defined for that particular fish.

Figure 6:
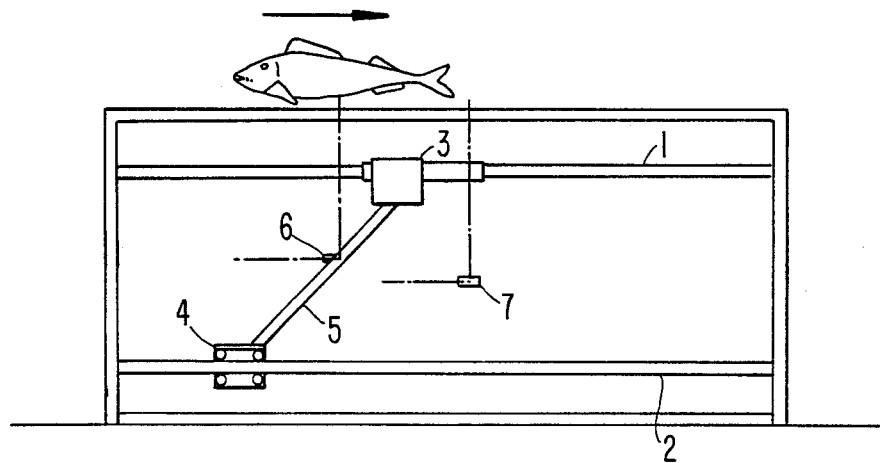

Step (3) As triangle abc moves downstream, measuring bar 5 contacts cutting control sensor 6 (FIG. 6). The vertical height of sensor 6 was preselected at a desired proportion of distance ac based on the fish specie being processed and the anatomical location of the fish where a processing operation is needed. For illustrative purposes, a proportional value for cod splitting will be used and sensor 6 is set at a distance below rail 1 equal to 45% of distance ac. An uncovered splitter blade is positioned in the fish processing path. As the fish travels over the splitter blade, measuring bar 5 contacts sensor 6. At that moment, the blade has split 45% of the fish as measured from the fish tail and sensor 6 actuates a control mechanism which raises blade guards about the splitter blade to prevent the blade from penetrating into the skeletal region or gutted cavity so that the "sound bone" (backbone) of the cod fish remains intact for subsequent efficient removal thereof.

Figure 7:
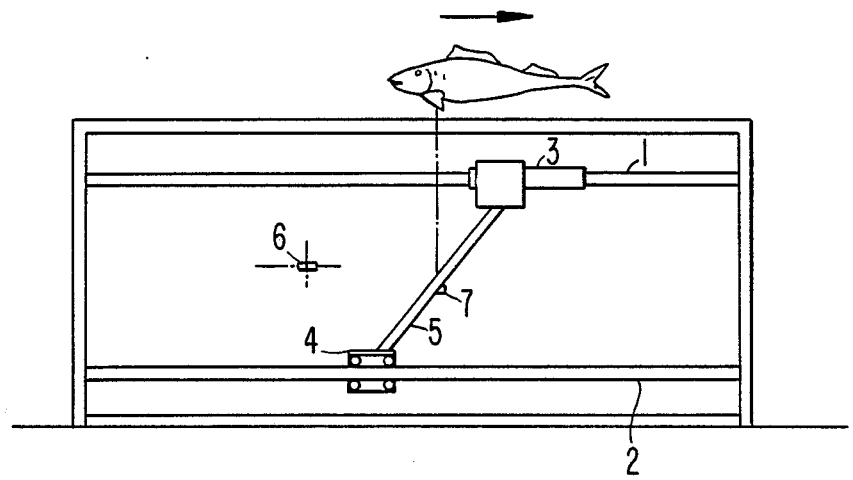

Step (4) The measuring bar 5 continues to travel downstream and contacts cutting control sensor 7 which is vertically positioned to proportionally correspond to 55% of the fish length (FIG. 7). At that moment sensor 7 actuates a control mechanism which lowers blade guards away from bone removal blades positioned in the fish processing path. The bone removal blades then remove the sound bone. The bone removal cut starts at a point spaced from the fish tail by a distance equal to 55% of the measured fish length.

Figure 8:
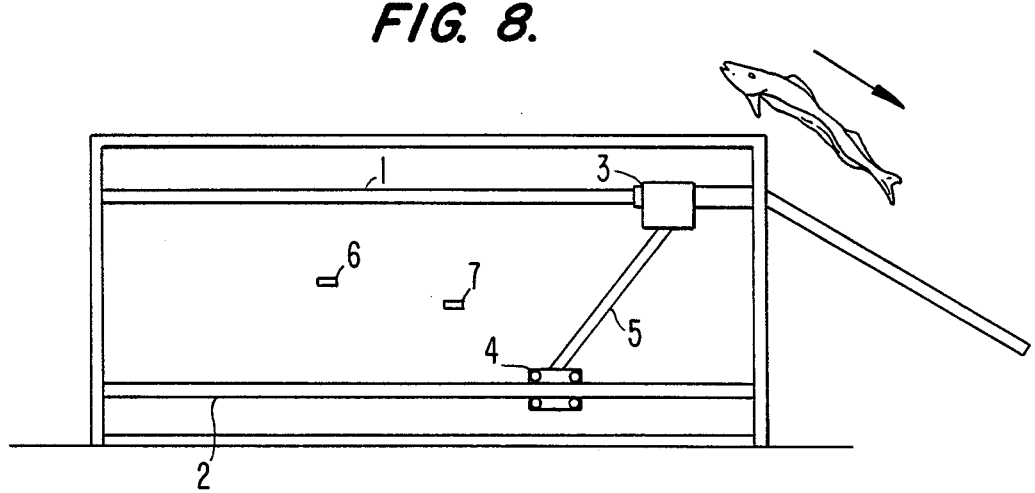

Step (5) As transport carriage 3 continues to travel downstream, it reaches the end of its feed stroke and discharges the processed fish (FIG. 8). Carriages 3 and 4 are ready to return to their original positions. When carriage 4 reaches its original position at the end of a return stroke, it is latched in position by the above mentioned latch mechanism, and the lock on measuring bar 5 is released allowing measuring bar 5 to retract toward a vertical position.

This completes one cycle.

Figure 9:
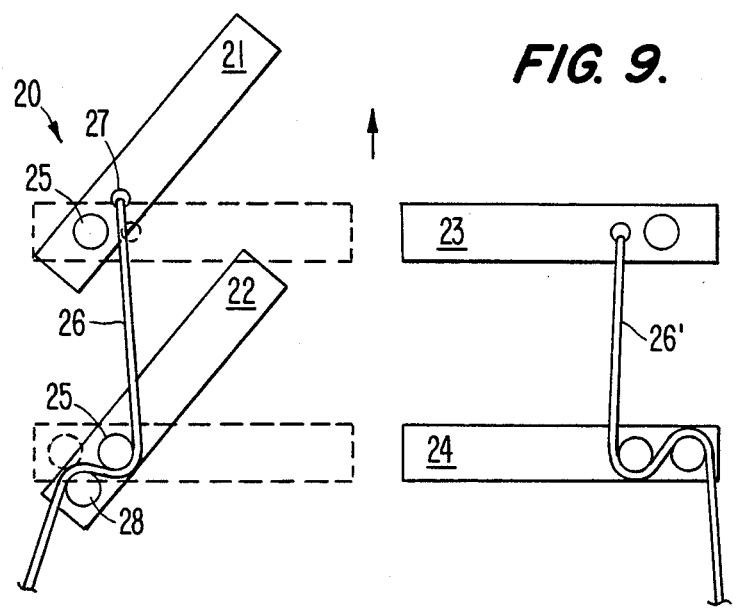
FIG. 9 is a top plan view of the fish length measuring mechanism.

The fish length measuring mechanism can be seen in FIGS. 1, 2, 9–11 and 15. However, FIGS. 9–11 best illustrate the operational characteristics of fish length measuring mechanism 20 and its relationship to lower carriage release latch 29. Referring to FIG. 9, length measuring mechanism 20 includes two pairs of feelers which detect when a fish is present. Feeler bars 21, 22, 23 and 24 are each pivotally secured to an upper surface of a first portion of fish guide structure 10, upstream from the cutting tools as depicted in FIGS. 1, 2 and 15. Returning to FIG. 9, each feeler bar is biased toward a closed position by springs (not shown). In FIG. 9, feeler bars 21 and 22 are shown in an open position and feeler bars 23 and 24 are shown in a closed position for illustrative purposes only. The arrow in FIG. 9 indicates fish direction as the fish travels tail first between the feeler bars.

The features of each feeler bar pair are similar. Consequently, only one pair will be described in detail. Feeler bars 21 and 22 are pivotally secured to fish guide structure 10 by pins 25. Flexible carriage latch release cord 26 is (1) attached to pin 27 on feeler bar 21; (2) passed around pivot pin 25 on feeler bar 22; (3) passed around fixed pin 28 on feeler bar 22; and (4) attached to carriage latch 29. Latch or lever 29 is pivotally secured to the frame, such as the vertical columns adjacent lower rails 2 depicted in FIG. 1. Latch 29 is provided with latch notch 29.1 which cooperates with a projection on carriage 4 (see FIGS. 10 and 11). When flexible cord 26 is tightened, latch 29 is lifted and carriage 4 is released.

When the fish begins to pass through the feeler bars, bars 22 and 24 rotate to an open position. Rotation of feeler bar 22 causes cord 26 to slacken due to displacement of pin 28 (FIG. 9). However, rotation of feeler bar 21 causes pin 27 to displace by an equal amount in the opposite direction. Therefore, when the fish begins to pass through feeler bars 21 and 23, the slack in cord 26, due to rotation of bars 22 and 24, is taken up. As the fish passes feeler bars 22 and 24, they are snapped closed by the springs referred to above and not shown. As feeler bar 22 rotates to a closed position, pin 28 returns to its original position. This displacement of pin 28 sufficiently tightens cord 26 to lift latch 29 from carriage 4. Therefore, the fish length is determined at the moment transport carriage 3 pulls the end of the fish past feeler bars 22 and 24. At that moment, cord 26 lifts latch 29 which in turn releases carriage 4 to travel along linear rail 2 thereby preventing further extension of measuring bar 5.

Both feeler pairs 22, 24 and 21, 23 are necessary. If only pair 22, 24 was present, latch 29 would be lifted whenever the feeler bars were in a closed position allowing carriage 4 to freely move at anytime. Using both pairs, the latch is only lifted when feeler pair 22, 24 is closed and feeler pair 21, 23 is open. The latch is lowered when the fish, having passed feeler pair 22, 24, passes feeler pair 21, 23 so feeler bars 21 and 23 rotate to a closed position. Cord 26' operates similarly to cord 26. Cord 26' may be attached to a second, but similar, carriage latch device for the second follower carriage of a dual fish transport assembly machine as depicted in FIGS. 1 and 2.

Figure 12:
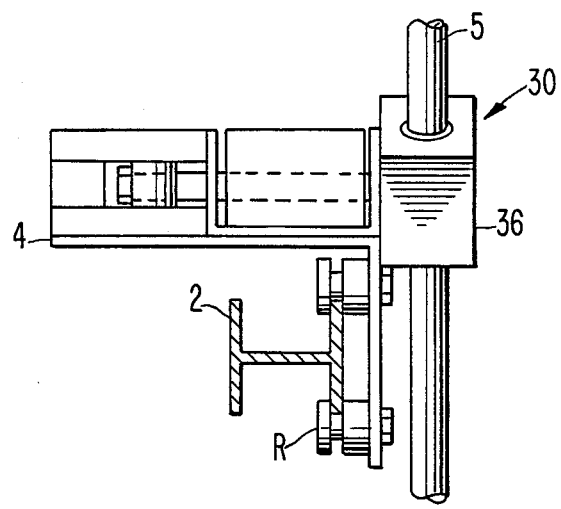
FIG. 12 is a cross-sectional view of the lower carriage rail taken along line 12—12 of FIG. 11 and further shows an end view of the lower carriage and measuring bar locking assembly.
Figure 13:
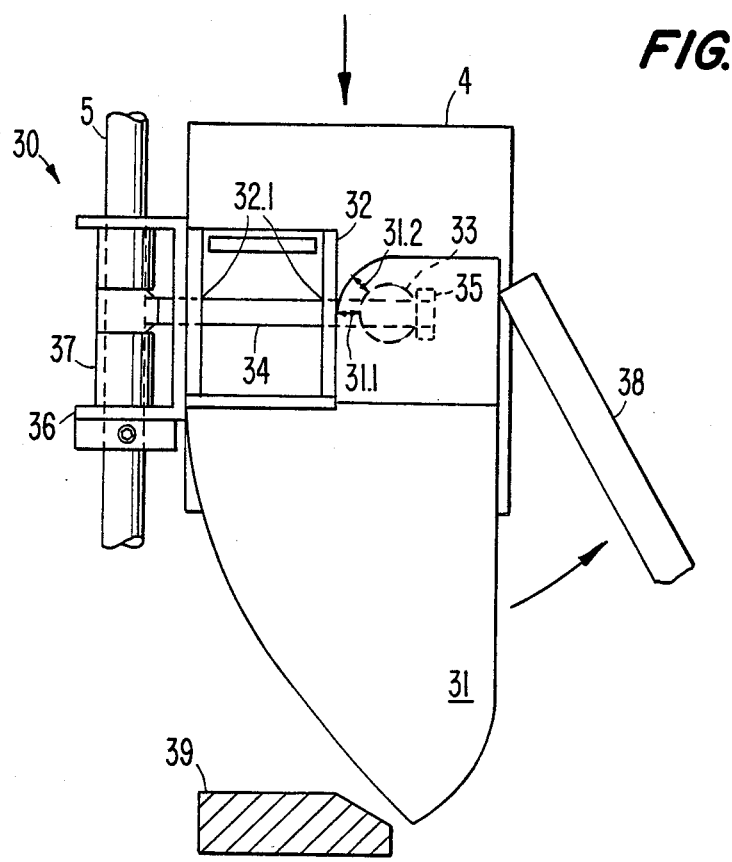
FIG. 13 is a top plan view of the measuring bar locking assembly of FIG. 12 in the locked position.
Figure 14:
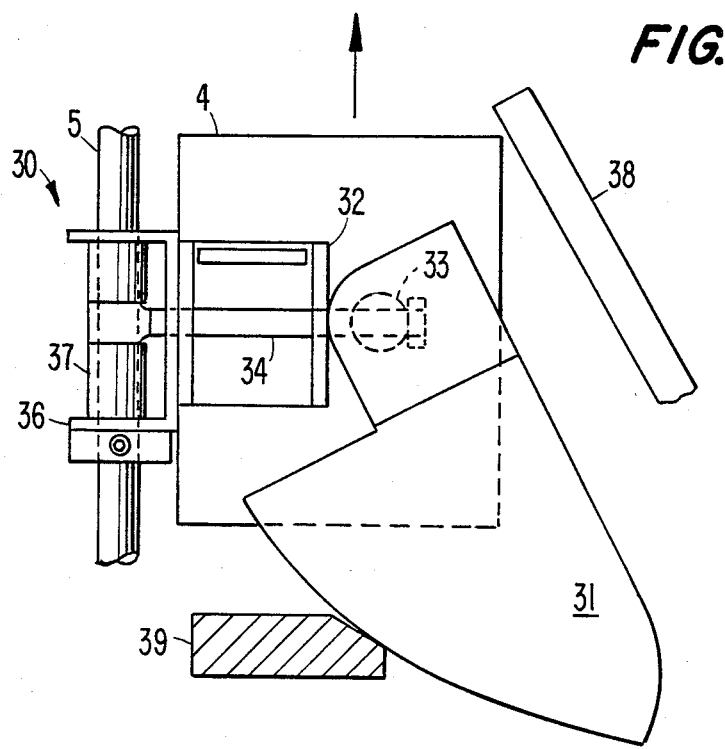
FIG. 14 is a top plan view of the measuring bar locking assembly of FIGS. 12 and 13 in the open position.

FIGS. 12–14 illustrate measuring bar locking assembly 30 and its relationship to lower carriage 4. FIG. 12 is an end view of the locking assembly and lower carriage mounted on lower rail 2 shown in cross-section. Lower rail 2 is shown as an I-beam. Four rollers R (two rollers are behind the two shown in FIG. 12) are provided for appropriate carriage support and travel along the I-beam.

FIG. 13 illustrates the measuring bar locking assembly in its locked position, while FIG. 14 illustrates the measuring bar locking assembly in its unlocked or open position.

In FIG. 13, carriage 4 is approaching frame 39 on a return stroke. Frame 39 is part of either vertical column adjacent to projections 38 (see FIG. 1). U-shaped plate or channel member 32 is secured to the upper surface of carriage 4. Cam member 31 is pivotally secured to eyebolt 34 through pivot pin 33. Eyebolt 34 first extends through holes or slots 32.1 in member 32 and then through a slot or hole in pivot pin 33. Therefore, cam 31 is secured to carriage 4 through eyebolt 34 and channel member 32 due to the pivot pin between eyebolt 34 and cam 31.

Locking member 35 restrains eyebolt 34 from moving away from cam 31 toward chassis 36. Measuring bar 5 is inserted through holes in bushing chassis 36 and through bushing 37. The fit between bushing 37 and measuring bar 5 provides sufficient friction so as to enable measuring bar 5 to pull or push carriage 4 along rail 2 without slippage between measuring bar 5 and bushing 37. However, the frictional force between the measuring bar and the bushing is not sufficient to prevent bar 5 from sliding through bushing 37 when carriage 4 is in its latched position (see FIG. 10) while transport carriage 3 is moving downstream during a feed stroke. Furthermore, bushing 37 and bushing chassis 36 are pivotally mounted to member 32 and pin 35. Therefore, the bushing and bushing chassis may rotate and measuring bar 5 may rotate therewith while sliding therethrough when transport carriage 3 travels downstream along rail 1 with the lower carriage fixed in its latched position during the fish length measuring cycle.

Figure 11:
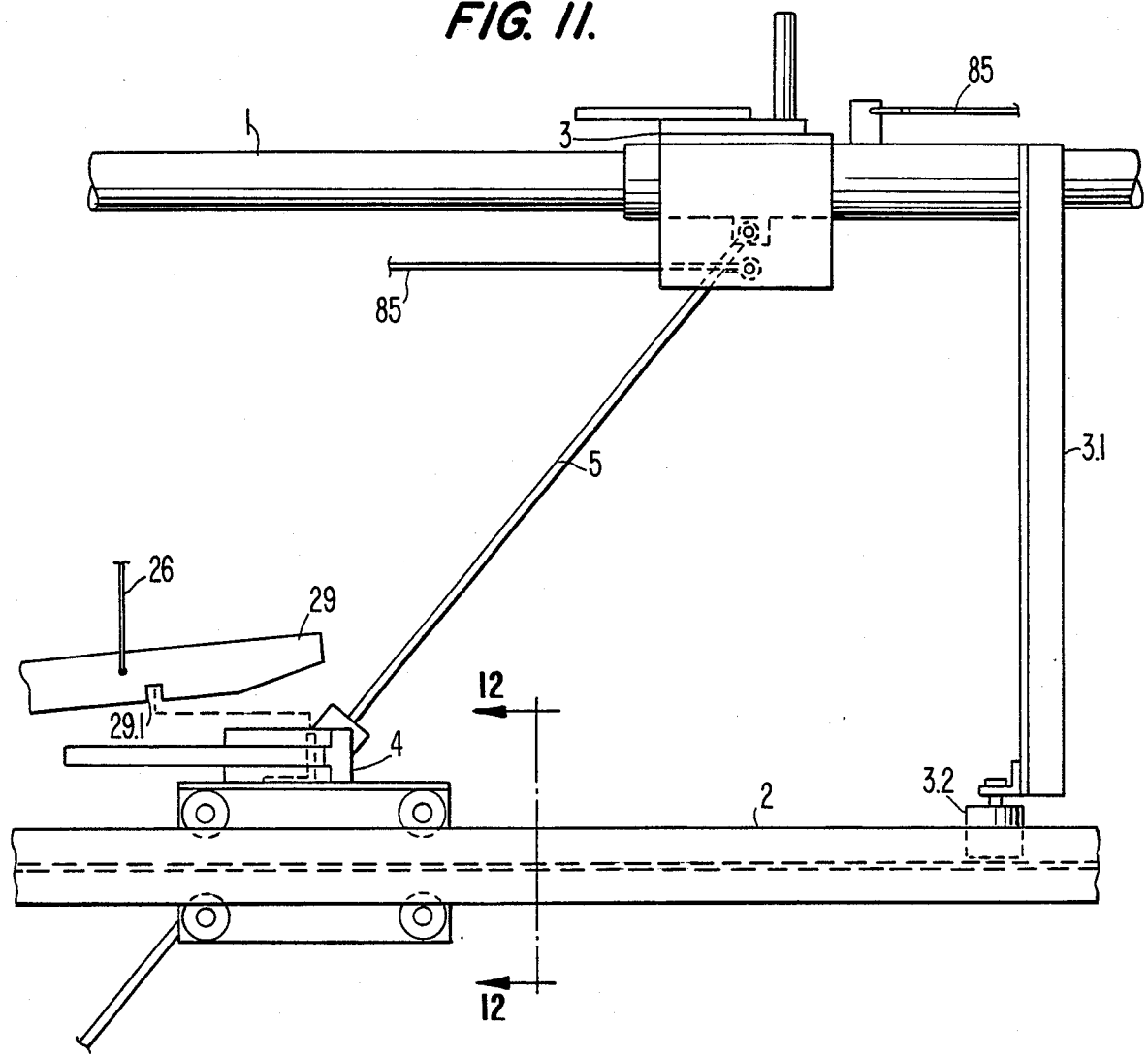
FIG. 11 is a side elevational view showing the lower carriage latch device in the release position after the fish length has been determined.

Cam 31 constitutes a locking mechanism to ensure that measuring bar 5 will not move relative to bushing 37 or carriage 4 after the fish length has been determined and carriage latch 29 has been released (FIG. 11). Even though the friction fit between measuring bar 5 and bushing 37 prevents slippage therebetween while an upper and lower pair of carriages are in motion, cam 31 provides a further mechanism to ensure that bar 5 will not slide in bushing 37 when bar 5 contacts sensors 6 or 7.

One end of eyebolt 34 has a cylindrical opening for housing cylindrical bushing 37. The distance from an edge of cam 31, which contacts channel member 32 to pin 33, when cam 31 is in the closed position and designated as 31.1, is slightly greater than a similarly measured distance designated as 31.2 when cam 31 is in the open position. Therefore, when cam 31 is in a closed position against member 32, cam 31 exerts a force on pin 33 which causes pin 33 to move to the right and urge member 35 in the same way. Member 35, which is secured to bolt 34, then displaces bolt 34 to the right which in turn displaces bushing 37 toward cam 31. This displacement causes the centroidal axis of bushing 37, previously aligned with the centers of the measuring bar receiving holes in chassis 36, to be slightly out of alignment with the centers of those holes. Such misalignment creates additional forces (e.g., additional frictional forces) between measuring bar 5, and its bushing and bushing chassis, so as to further prevent slippage therebetween.

As cam 31 strikes frame 39 at the end of a return stroke (FIGS. 13 and 14), cam 31 opens due to the illustrated mating profiles of cam 31 and frame 39. As a result, measuring bar 5 may easily slide through bushing 37 enabling transport carriage 3, measuring bar 5 and carriage 4 to approach vertical alignment and complete the return stroke.

In FIG. 14, carriage 4 is about to begin a feed stroke. Projection 38 extends from the frame and into the path of cam 31 (see FIG. 1). When latch 29 releases carriage 4, the friction force between measuring bar 5 and bushing 37 is sufficient to permit measuring bar 5 to pull carriage 4 away from frame 39 without further extension of measuring bar 5. Shortly after carriage 4 pulls away from frame 39, cam 31 strikes projection 38 which closes cam 31 as carriage 4 continues to move forward. Thus, measuring bar 5 is locked at a particular position determined by that fish length.

In the alternative, other locking mechanisms for applying a friction force on measuring bar 5 may be substituted for the cam mechanism. For example, a spring may be associated between measuring bar 5 and its mount on lower carriage 4 to apply a continuous friction force on the bar in lieu of the cam mechanism, which only causes such force when it is in the locked position. However, the spring constant should be selected to allow bar 5 to slide through its connection during the fish length measuring stage.

The sensors and actuation of the control mechanisms for controlling the processing devices, e.g., blades, will be described below with reference to FIGS. 15-20 and 24.

Referring to FIG. 16, a bottom view of sensors 6 shows sensor actuation arms 6.1 being pivotally connected to the bottom of frame center beam 90 at pivot pin 6.2. For purposes of clarity, only one of the two identical sensors will be described in detail. One end of the actuation arm includes vertical height adjustment bar 6.3 pivotally connected thereto while the other end rests against latch member 41. Bar 6.3 is positioned to vertically position the sensor according to the desired proportionality value previously discussed. A spring has one end secured to the actuator arm and the other end secured to the frame. The arrow in FIG. 16 indicates the travel direction of measuring bar 5 during a feed stroke.

Referring to FIG. 15, sensor 6 actuates first blade control mechanism 40 by displacing latch member 41 which is pivotally connected to the frame through pivot pin 43. Latch 41 includes latch notch 42 which latches catch plate 45 due to the force of latch spring 44 connected between latch 41 and the frame. Catch plate 45, which extends beneath center beam 90, is fixedly secured to two similar control rods 46 which are slidably mounted in the frame for vertical movement (one control rod is hidden behind the control rod 46 shown in FIG. 15). One end of each rod 46 includes stop member 47 to limit the upward movement of a respective rod 46, while the other end of each rod 46 is connected to a respective blade guard 14.1. Drive lever 48 is pivotally connected to the frame through pivot pin 48.2. One end of lever 48 is pivotally attached to coupler 48.1 which in turn is pivotally attached to catch plate 45. The other end of lever 48 is pivotally secured to reset slider 68 which is slidably mounted on reset rod 66. Lever 48 also includes drive spring 49 having one end secured to lever 48 and the other end secured to the frame.

During a feed stroke, the direction of measuring bar 5 relative to sensor 6 is indicated by the arrow depicted in FIG. 16. As measuring bar 5 contacts bar 6.3 during a feed stroke, thereby displacing arm 6.1 which in turn displaces latch 41, catch plate 45 is released. Then drive spring 49 pivots lever 48 so as to lift catch plate 45 upwardly and control rods 46 therewith. As a result, splitter blade guards 14.1 are displaced upwardly to guard the fish from splitter blade 14.

Figure 18:
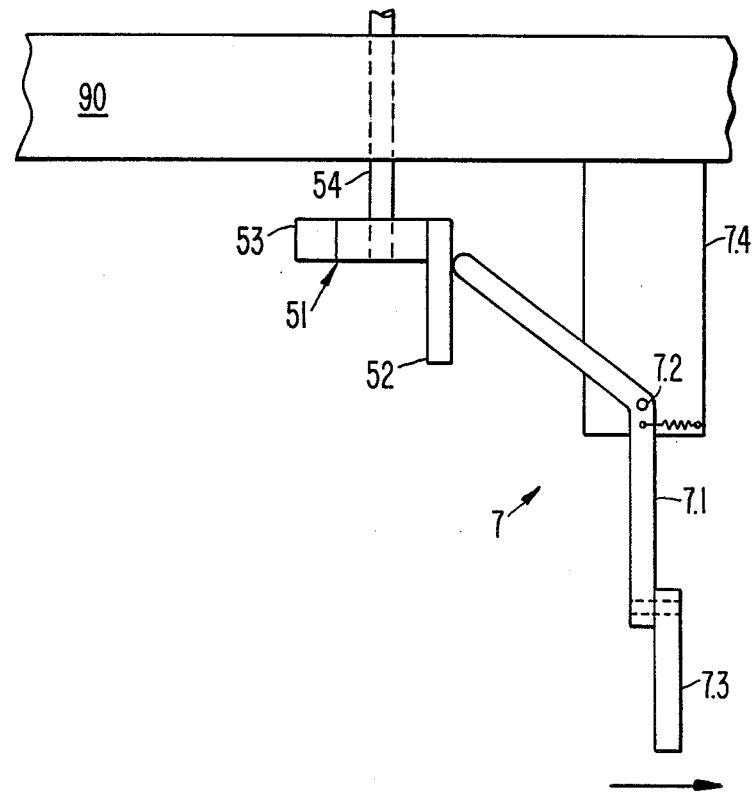
FIG. 18 is a top view of the second sensor mechanism of FIGS. 15 and 17 showing its relationship to the second blade guard control mechanism.

Sensor 7 and its associated second blade control mechanism 50 can best be understood while viewing FIGS. 15, 17 and 18. FIG. 18 shows sensor 7 from an overhead perspective as including actuation arm 7.1 pivotally secured to support plate 7.4 through pivot pin 7.2. Support plate 7.4 extends from the frame. One leg of angled actuation arm 7.1 has a first portion connected to plate 7.4 by a spring and an end portion connected to vertical height adjustment bar 7.3 which is pivotally connected thereto. The other leg of actuation arm 7.1 rests against latch projection 52 of second control mechanism latch 51. In brief, sensor 7 actuates second blade control mechanism 50 by displacing latch projection 52 which extends from latch member 51. Furthermore, latch 51 is pivotally secured to beam 90 through pivot pin 54, and is fixedly secured to a second latch, not shown, but which is substantially identical therewith. Therefore, the hidden second latch is pivotally secured to the other side of beam 90. The second latch, hidden in the side view of FIG. 15, is associated with a second sensor identical to first sensor 7, which is shown in FIGS. 15, 17 and 18, and in the same way as latch 51 is associated with first sensor 7. Therefore, latch 51 can be triggered from either side of beam 90.

Figure 19:
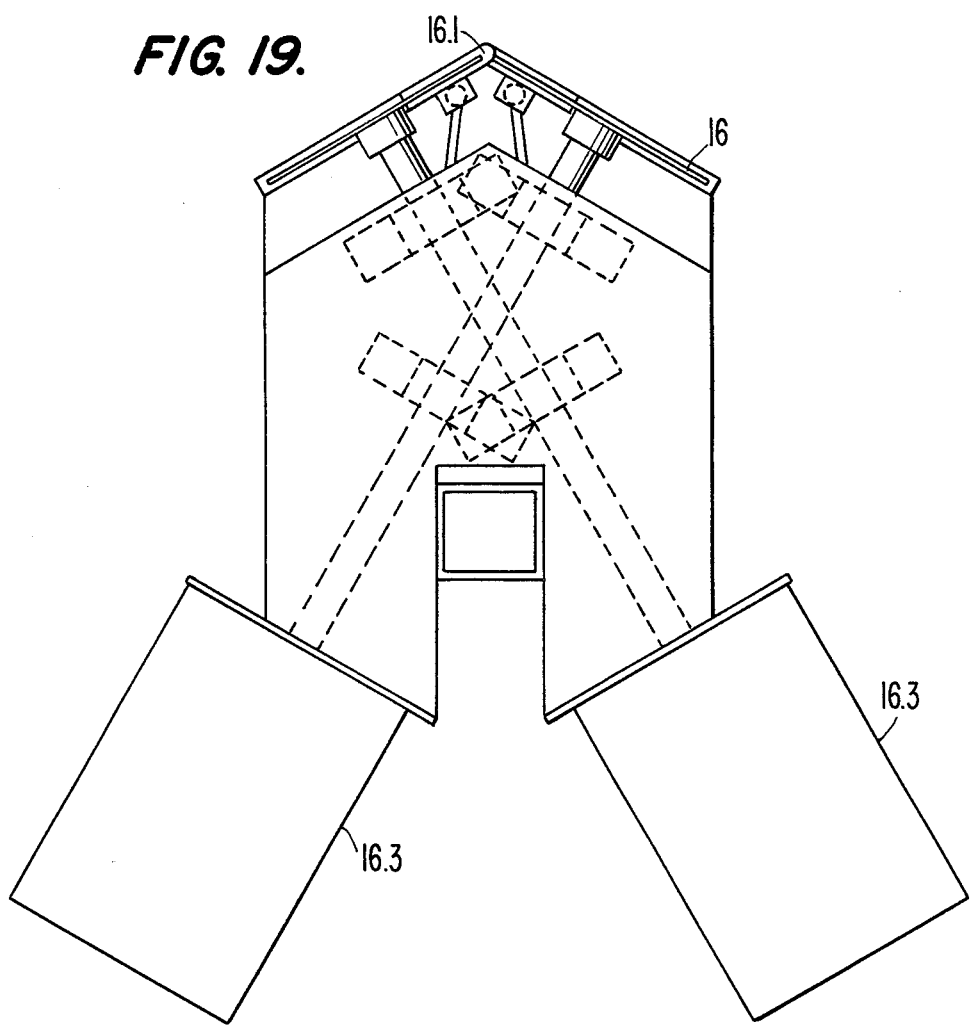
FIG. 19 is a partial cross-sectional view of the second blade guard mechanism taken along lines 19—19 of FIG. 15.
Figure 20:
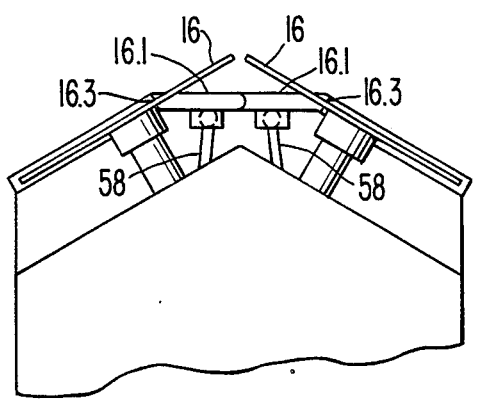
FIG. 20 is an operational view of the second blade guard mechanism depicted in FIG. 19 showing the blade guards in the lowered position.

Referring to FIGS. 15 and 17, control mechanism 50 includes latch member 51 pivotally connected to the frame through pivot pin 54. Latch 51 further includes notch 53 for latching drive lever 55 in the position shown in FIGS. 15 and 17. The second hidden latch, discussed above, does not need such a latch notch because only one drive lever 55 is necessary. Drive lever 55 is pivotally secured to the frame through pivot pins 56. One end of lever 55 is pivotally connected to both control rods 58 through pivot pin 59 which extends under beam 90 (one control rod is hidden behind control rod 58 shown in FIG. 15), while control rods 58 are secured to V-blade flap guards 16.1 (FIGS. 19 and 20). The other end of lever 55 is pivotally secured to reset slider 68 which is slidably mounted to reset rod 66. Lever 55 also includes drive spring 57 having one end secured to lever 55 and the other end secured to the frame.

The arrow in FIG. 18 indicates the direction of measuring bar 5 relative to sensor 7 during a feed stroke. As measuring bar 5 contacts bar 7.3, thereby pivotally displacing arm 7.1 which in turn displaces latch 51, drive lever 55 is released. Then drive spring 57 pivots lever 55 so as to drive control rod 58 downwardly. As a result, V-blade flap guards 16.1 are displaced downwardly so that the then exposed bone removal blades 16, driven by motors 16.3, may remove the, for example, sound bone of a cod. It can be appreciated while viewing FIGS. 2, 19 and 20 that flap guards 16.1 are hingedly secured to their adjacent support at 16.3 to permit raising and lowering thereof. The interfaces between the flaps are meshed so that in a raised position they provide continuous support along the center line of the fish path and they do not interface with each other when displaced.

The processing will now be described with respect to the fish. The fish that was previously split by the vertical blade is spread over the spreader plate as it approaches the V-blades. The tail and approximately the first half of the fish slide over the flap guards which are in their raised position to prevent the fish from being cut. When the sound bone approaches the V-blades, sensor 7 trips the control mechanism which lowers the flap guards. This exposes the bone removal cutting blades. The tail grip assembly pulls the fish over these blades which cut out a V-shaped section from the fish. This V-shaped cut out corresponds to the shape of the sound bone.

The blade guard positions will now be described with respect to a complete cycle. Splitter blade 14 is normally exposed with blade guards 14.1 in their lowered position while blades 16 which form a V configuration are normally guarded by flap guards 16.1. When measuring bar 5 contacts sensor 6, sensor 6 actuates control mechanism 40 which disengages splitter blade 14 by raising blade guards 14.1. On the other hand, when measuring bar 5 continues to travel downstream, it contacts sensor 7. Sensor 7 then actuates control mechanism 50 which engages bone removal blade 16 by lowering flap guards 16.1. Before the other transport carriage proceeds through a feed stroke, latch reset assembly 60 resets latches 41 and 51 so that blade guards 14.1 are returned to a lowered position, thereby exposing splitter blade 14, and flap guards 16.1 are raised, thereby covering bone removing blades 16.

Latch reset assembly 60 is synchronized with drive mechanism 80 which provides the transport carriages with reciprocating motion. Therefore, the description of the latch reset assembly will follow the description of the drive mechanism.

Referring to FIG. 15, drive mechanism 80 includes motor 81 having a belt for driving splitter blade 14. Motor 81 includes another belt which drives gear box 88. The output of the gear box is connected to drive 82 thereby rotating drive 82 which is pivotally connected to push rod 83. As a result, drive 82 provides push rod 83 with reciprocatory motion. Push rod 83 provides crank arm 84, which is secured to four pulleys at one end and is pivotally connected to the frame at its other end, with oscillatory motion (see FIGS. 15 and 24). In FIG. 24, it can be seen that drive cable 85 is fixed to the frame at one end, extends around pulleys 87 (only a few pulleys have been designated for purposes of simplification and clarity), and is fixed to the frame at its other end. When crank arm 84 oscillates with the four abovementioned pulleys, cable 85 provides transport carriages 3, which are attached thereto, with reciprocatory motion.

Although a preferred drive mechanism has been described, alternative drive mechanisms which produce reciprocatory motion may be used to reciprocate transport carriage(s) 3 through feed and return strokes. For example, other crank linkages, or hydraulic or pneumatic drive mechanisms, could provide appropriate reciprocatory motion.

Returning to FIG. 15, latch reset assembly 60 is associated with drive mechanism 80 through drive member 82. Because cam 61 and drive 82 are both mounted to the output end of gear box 88, transport carriage movement and cam actuated latch resetting are synchronized. Cam 61 has two lobes 61.1 and 61.2. As cam 61 rotates, the cam lobes displace cam follower 62 which is pivotally mounted to the frame through pivot pin 63. Therefore, follower 62 pivots and displaces reset bar 64, which is pivotally mounted to follower 62 and slidably mounted to the frame, to the left. Reset rod 66 includes reset sliders 68 slidably mounted thereon and reset blocks 67 fixedly secured thereto by, for example, set screws. Reset rod 66 is pivotally connected to reset bar 64, so that when either cam lobe displaces follower 62, reset bar 64 pulls reset rod 66 which in turn pulls reset blocks 67 against reset sliders 68. As a result, reset sliders 68 move to the left. One reset slider causes drive lever 48 to lower blade guards 14.1 while resetting catch plate 45 in latch notch 42. The other reset slider causes drive lever 55 to engage with latch notch 53 while raising control rods 58 to guard blades 16 with flap guards 16.1. Spring 65 is connected between reset bar 64 and the frame to maintain cam follower 62 against the cam surface as cam 61 rotates. When crank arm 84 completes one stroke, cam 61 rotates 180°. Therefore, cam 61 rotates 180° when either transport carriage completes a feed or return stroke. In sum, lobe 61.1 resets latches 41 and 51 in their latched position after one transport carriage completes a feed stroke, while lobe 61.2 resets the same latches after the other transport carriage completes a feed stroke.

Figure 21:
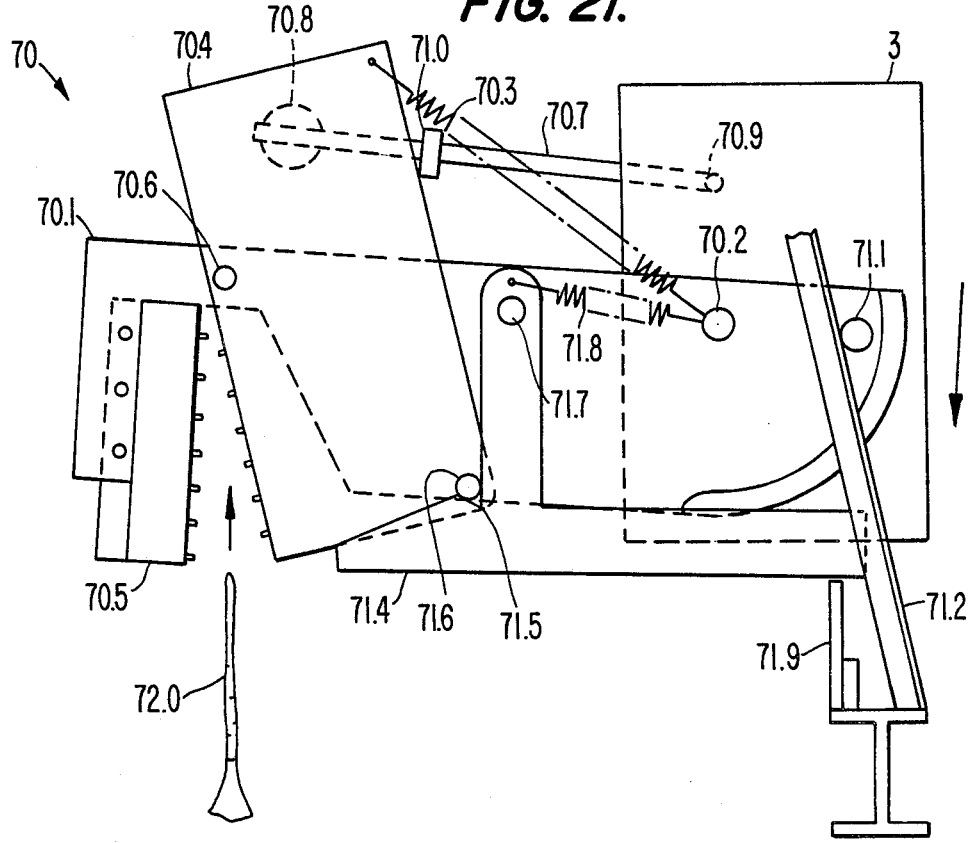
FIG. 21 is a top plan view of the tail grip assembly in the fish tail loading position.
Figure 22:
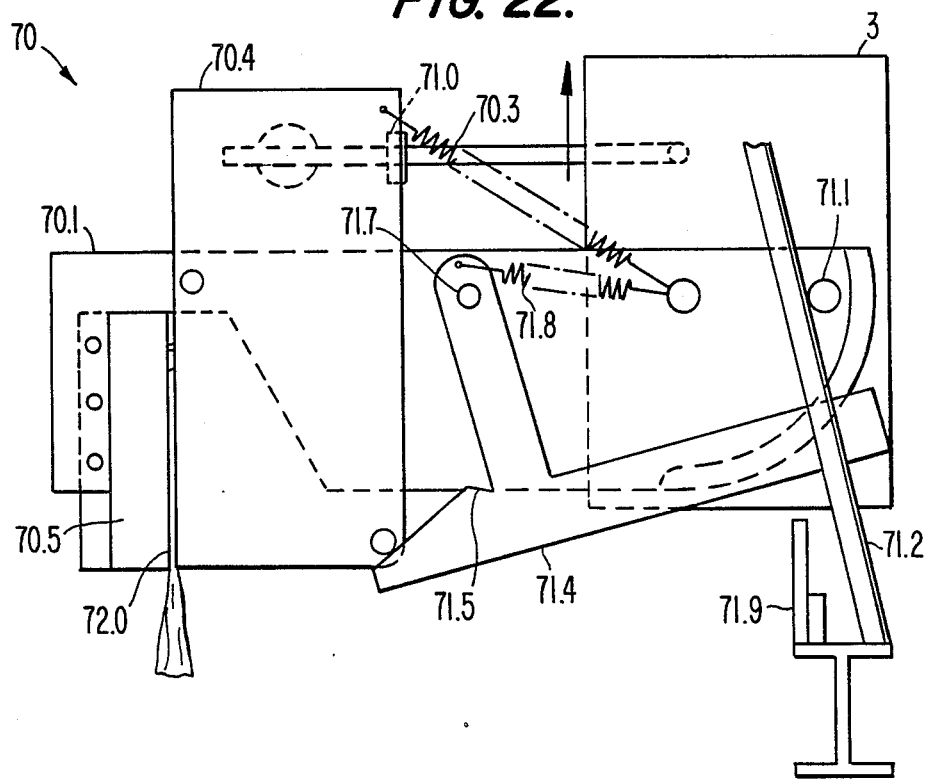
FIG. 22 is a top plan view of the tail grip assembly of FIG. 22 in the loaded position.
Figure 23:
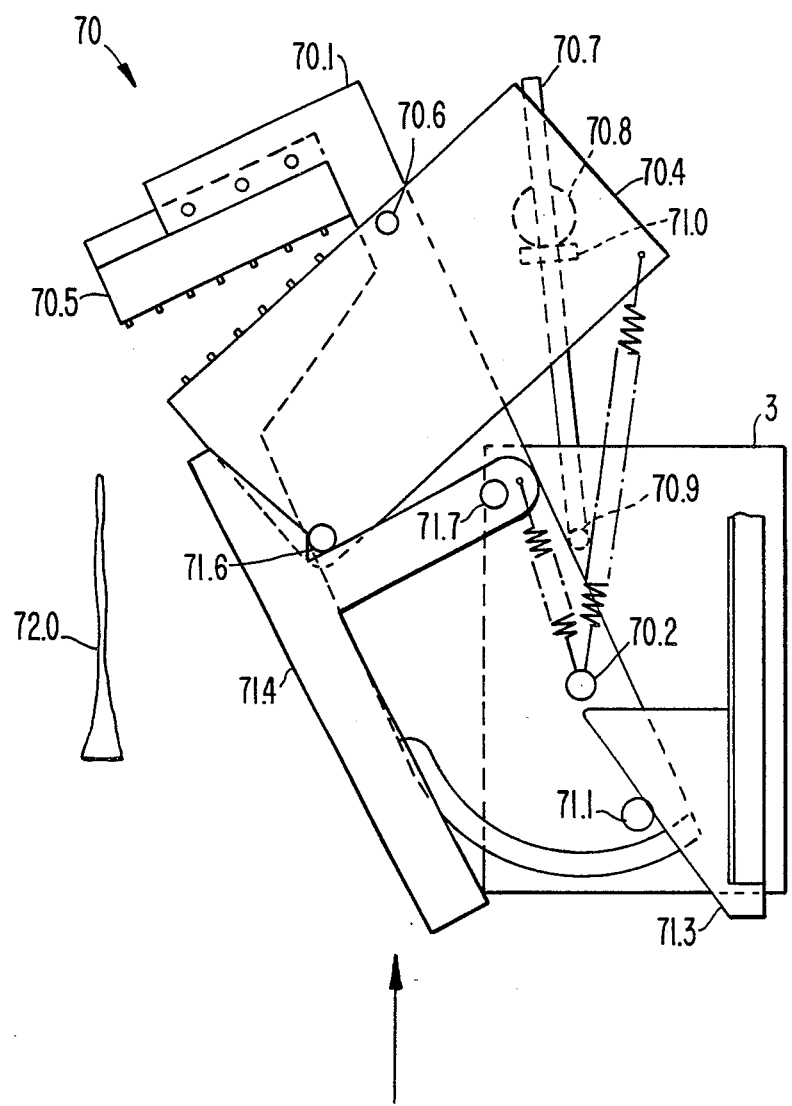
FIG. 23 is a top plan view of the tail grip assembly of FIGS. 22 and 23 in the release position.

FIGS. 21-23 show the tail grip assembly in detail. In FIG. 21, fish tail 72.0 is being loaded into tail grip assembly 70 as chassis 70.1 rotates from a position parallel to rail 1 to a position perpendicular to rail 1, at the completion of a return stroke, so that jaws 70.4 and 70.5 extend over the fish processing path. In FIG. 22, the fish tail has been loaded and transport carriage 3 begins to proceed through a feed stroke and the chassis of the tail grip assembly is being rotated to a position parallel to rail 1 in preparation for a return stroke. This rotation causes the jaws to expand and release the fish tail so that the processed fish may be discharged. After the tail grip assembly becomes parallel with rail 1, its direction is reversed. However, its orientation remains parallel to its travel direction until it reaches the completion of a return stroke, thereby allowing it to pass the tail grip assembly on the other side of guide structure 10, which at that time is traveling through a feed stroke, without interference therebetween.

Referring to FIG. 21, tail grip assembly 70 includes arm or chassis 70.1 rotatably connected to a respective transport carriage 3 through pivot point or pin 70.2. One end of jaw spring element 70.3 is attached to chassis pin 70.2. The other end of spring 70.3 is attached to rotating jaw member 70.4 which is pivotally attached to the chassis about pin 70.6. Fixed jaw member 70.5 is formed as an extension of chassis 70.1. Pins may be incorporated on the opposed faces of the jaw members to enhance the gripping effect. The tail grip assembly further includes a fish tail releasing mechanism which is primarily actuated by push rod 70.7. Push rod 70.7 has one end slidably mounted in a hole of bushing 70.8, which is rotatably mounted to the underside of rotating jaw 70.4, and the other end pivotally secured to the underside of transport carriage 3 at 70.9. Push rod 70.7 further includes collar 71.0 fixedly secured thereabout. Post 71.1 provides a mechanism for rotating the chassis and actuating the fish tail releasing mechanism which is fixed to chassis 70.1 and extends vertically upward therefrom as can be seen while viewing FIGS. 1, 2 and 21-23. As transport carriage 3 approaches the end of a feed stroke, post 71.1 cooperates with plate 71.3 to rotate the tail grip assembly parallel to its travel direction, while at the completion of a return stroke, post 71.1 cooperates with extension 71.2 to rotate the tail grip assembly perpendicular to its travel direction.

The tail grip assembly is also provided with latch member 71.4 having a notch 71.5 for lockingly receiving post 71.6, which extends vertically upward from the upper surface of rotating jaw member 70.4. Latch member 71.4 is pivotally secured to chassis 70.1 through pivot pin 71.7. Latch member 71.4 is also provided with spring 71.8 for biasing latch 71.4 in a latched position with jaw post 71.6 secured in latch notch 71.5 as can be seen in FIG. 21. Spring 71.8 has one end secured to latch 71.4 and the other end secured to pin 70.2. Referring to FIGS. 21 and 22, latch 71.4 contacts latch tripping member 71.9, which extends from the machine frame, while completing a return stroke. Latch tripping member 71.9 forces the latch to pivot about pin 71.7 and release jaw post 71.6 so that jaw spring 70.3 may rotate jaw 70.4 to a closed position with fish tail 72.0 loaded thereon.

Once the fish is loaded, transport carriage 3 proceeds downstream through a feed stroke. As carriage 3 approaches the end of the feed stroke, post 71.1 contacts plate 71.3 (FIG. 23). Because carriage 3 continues to move, plate 71.3 causes post 71.1 to rotate about pivot pin 70.2, which in turn causes chassis 70.1 to similarly rotate. As the chassis rotates toward a position parallel to rail 1, push rod 70.7 slides through bushing 70.8 until collar 71.0 abuts bushing 70.8. As the chassis continues to rotate, collar 71.0 pushes on bushing 70.8, thereby causing rotating jaw 70.4 to rotate about pin 70.6 and release the fish. Furthermore, as jaw 70.4 rotates, jaw post 71.6 mates with latch notch 71.5 and spring biased latch 71.4 latches rotating jaw 70.4 in the open position for the following return stroke and tail grip assembly loading stage.

Obviously, the materials used in the making of the apparatus may be selected from a wide variety of materials. Merely to exemplify a preferred makeup of material selection, the following example may be recited. The blade guards, sensor actuation arms, guide members and transport carriage tube members which surround the transport rails are made from plastic, such as nylon. The transport rails are made of stainless steel, while the lower rails which support the follower carriages are made of aluminum. The frame is, otherwise, substantially made of aluminum.

Having described a preferred embodiment in detail, it will be recognized that the foregoing is considered as illustrative only of the principles of the invention. Further, since numerous modifications and changes will readily occur to those skilled in the art, such as substituting a telescoping bar design for the measuring bar design described above, it is not desired to limit the invention to the exact construction, materials, assembly, etc. shown and described. Accordingly, all suitable modifications and equivalents may be resorted to to the extent that they fall within the scope of the invention and claims appended hereto.

I claim:

1. An apparatus for automatically controlling engagement of processing mechanisms comprising:
    a substantially linear guide structure forming a processing path;
    first transport carriage means for conveying items along said processing path comprising a first transport carriage;
    a substantially straight bar having first and second ends, said first end being pivotally associated with said first transport carriage;
    locking means for enabling angular and linear displacement of the second end of said bar when the first end of said bar is aligned with a first measuring portion of said processing path and restraining such angular and linear displacement when the first end of said bar is aligned with a second portion of said processing path downstream from said first measuring portion;
    at least one control means for controlling engagement of at least one of the processing mechanisms; and
    at least one sensing means for sensing when a portion of said bar is disposed vertically beneath said second path portion and generating an actuation signal denoting such a condition to said at least one control means.

2. The apparatus of claim 1 wherein said at least one processing mechanism is positioned along said processing path.

3. The apparatus of claim 1 wherein said first transport carriage means further comprises a first linear transport rail positioned substantially parallel to said processing path, said first transport carriage being slidably mounted on said first linear transport rail.

4. The apparatus of claim 3 wherein said first transport carriage means further comprises a lower rail disposed below and substantially parallel to said first linear transport rail and a lower carriage being slidably mounted on said lower rail, said locking means being secured to said lower carriage.

5. The apparatus of claim 4 wherein said locking means comprises a cylindrical bushing surrounding a portion of said bar.

6. The apparatus of claim 5 wherein said locking means further comprises a cam member pivotally mounted on said lower carriage, and linkage means for linking the cam to the bushing and displacing the bushing toward the lower carriage when the cam is in a closed position.

7. The apparatus of claim 6 wherein said locking means further comprises cam pivoting means for pivoting said cam from an open unlocked position to said closed locked position, said pivoting means includes a bar extending from the lower rail for closing the cam as the cam strikes the bar when the lower carriage moves along the lower rail, said pivoting means also including a curved surface on said cam for opening the cam as the cam strikes a portion of the frame of the apparatus which is adjacent one end of the lower rail.

8. The apparatus of claim 4 further including a measuring mechanism comprising detecting means for detecting the presence of a conveyed item.

9. The apparatus of claim 8 wherein said measuring mechanism further comprises:
lower carriage restraint means for releasably restraining the lower carriage from traveling along said lower rail; and
release means for releasing said restraint means in response to a signal generated by said detecting means.

10. The apparatus of claim 9 wherein:
said detecting means comprises a pair of bar members pivotally secured to said guide structure and positioned within said first measuring portion of said processing path and biasing means for biasing each bar member toward a position transverse to said processing path, one of said bar members being positioned downstream from the other;
said restraint means comprises a latch member pivotally mounted to the apparatus adjacent said lower rail for cooperation with a projection on said lower carriage; and
said release means comprises a flexible cord which is attached to said downstream bar member, passed around a pin on the other bar member and then attached to said latch member.

11. The apparatus of claim 10 wherein said detecting means further comprises a second pair of bar members, said first and second pairs being substantially symmetrically positioned about said processing path.

12. The apparatus of claim 3 wherein said transport carriage includes an arm extending from the transport carriage to said processing path, said arm having gripping means for releasably gripping an item to be conveyed along said processing path.

13. The apparatus of claim 12 wherein said arm is rotatably mounted on said transport carriage.

14. The apparatus of claim 13 wherein said arm further comprises pivot means for pivoting said arm to a position substantially parallel to said transport rail when said transport carriage approaches one end of said transport rail and for pivoting said arm to a position substantially transverse to said transport rail when said transport carriage approaches the other end of said transport rail.

15. The apparatus of claim 14 further comprising second transport carriage means substantially structurally corresponding to said first transport carriage means, said first and second transport carriage means being positioned along opposite sides of said linear guide structure.

16. The apparatus of claim 3 further comprising second transport carriage means substantially structurally corresponding to said first transport carriage means, said first and second transport carriage means being positioned along opposite sides of said substantially linear guide structure.

17. An apparatus for automatically controlling cutting tool engagement in a fish processing device comprising:
a substantially linear guide structure having at least one cutting tool associated therewith and forming a fish processing path;
transport carriage means for conveying a fish along said processing path comprising a first transport carriage;
a substantially straight bar having first and second ends, said first end being pivotally associated with said transport carriage;
locking means for enabling angular and linear displacement of the second end of said bar when the first end of said bar is aligned with a first measuring portion of said fish processing path and restraining such angular and linear displacement when the first end of said bar is aligned with a second portion of said fish processing path downstream from said first measuring portion;
at least one control means for controlling engagement of said at least one cutting tool with a fish traveling along said fish processing path; and
at least one sensing means for sensing when a portion of said bar is disposed vertically beneath said second path portion and generating a signal denoting such a condition to said at least one control means.

18. A method of processing fish comprising the steps of:
providing a preselected proportionality value;
mechanically setting a representation of a dimension of a fish comprising the step of locking a measuring bar in a particular orientation indicative of the length of the fish;
conveying the fish to at least one processing device for processing the fish; and
controlling the processing device in accordance with the representation of fish length and the preselected proportionality value.

19. The method of claim 18 wherein the conveying step comprises conveying the fish and the measuring bar to the processing device.

* * * * *